United States Patent Office 3,709,843
Patented Jan. 9, 1973

3,709,843
POLYURETHANE FOAMS HAVING
INCREASED DENSITY
Natale C. Zocco, East Haven, and Stanley I. Cohen, Orange, Conn., assignors to Olin Corporation, New Haven, Conn.
No Drawing. Continuation-in-part of applications Ser. No. 708,524, Feb. 27, 1968, now abandoned, Ser. No. 780,247, Nov. 29, 1968, now Patent No. 3,506,600, Ser. No. 573,189, Aug. 18, 1966, and Ser. No. 661,756, Aug. 4, 1967, both now abandoned. This application Apr. 9, 1970, Ser. No. 27,149
The portion of the term of the patent subsequent to Apr. 14, 1987, has been disclaimed
Int. Cl. C08g 53/08
U.S. Cl. 260—2.5 AN     11 Claims

ABSTRACT OF THE DISCLOSURE

Flexible, densified polyurethane foams are prepared by allowing a polyurethane foam-forming reaction mixture to rise, thereby forming a partially cured cellular material, maintaining the partially cured celluar material for a critical period of time at a critical environmental temperature, and applying a compressive force to the partially cured cellular material to reduce its volume by a desired amount. After removal of the compressive force, completion of the cure, and trimming, if necesary, the resulting flexible, densified polyurethane foams are useful as cushioning and rug padding.

---

This application is a continuation-in-part of copending applications Ser. No. 708,524, filed Feb. 27, 1968, Ser. No. 661,756, filed Aug. 4, 1967, and Ser. No. 573,189, filed Aug. 18, 1966, which are now abandoned, as well as Ser. No. 780,247, filed Nov. 29, 1968 now Pat. No. 3,506,600.

This invention relates to flexible, densified polyurethane foam compositions.

There is a great need at the present time for flexible synthetic materials useful as backing for floor coverings such as rugs and plastic tile, and for use as padding, cushions, mattresses and the like.

The preparation of polyurethane elastomers has been known for many years. U.S. Pat. No. 2,866,774 discloses a technique for preparing polyurethane rubbers by reacting a polyether glycol of at least 600 molecular weight with an organic polyisocyanate. Although this type of polyurethane elastomer is somewhat flexible, the density is generally greater than about 40 pounds per cubic foot and control of density is not easily obtained during processing. In addition, elastomers of this type generally must be prepared by batch-wise casting or molding rather than on a continuous basis.

Polyurethane foams known previously meet the flexibility and cost requirements, but they do not meet the density, resiliency and durability requirements which make them suitable for such uses as backing for floor covering materials and the like. It is shown in Plastics Progress 1955, by Philip Morgan, (Iliffe & Sons, Limited London) at figure 8, page 89, that a flexible polyester-based polyurethane foam having density of 7.5 pounds per cubic foot had a relatively uniform response to load when subjected to compression, while the same type of foam having density of only 3.5 pounds per cubic foot did not. Densified foams having a relatively uniform response to load of the type shown in FIG. 8 of the latter reference are more desirable as rug padding, cushions and the like. Numerous attempts have bene made prior to this invention to increase the density of flexible polyurethane foams, but the techniques employed and the results obtained have been unattractive for various reasons. As indicated in Plastics Progress 1955, the densified foam is prepared by selecting appropriate reactants. Unfortunately, reactants necessary to make the high density foams have a relatively high viscosity and are thus difficult to handle and react.

U.S. Pat. No. 3,298,976 discloses that flexible polyurethane foams having densities from about 3.0 to 4.2 pounds per cubic foot can be prepared by incorporating particles of barytes in the polyurethane foam forming reaction mixture. However, in addition to requiring an added ingredient, such polyurethane foams are unsuitable in applications where denser, flexible polyurethane foams are desired.

Polyurethane foams having a density of from about 25 to about 50 pounds per cubic foot have been made by a critical molding technique as described in U.S. Pat. No. 3,125,617. While these foams may be suitable for some applications, they do not have the properties necessary for such uses as rug padding.

It is also known that crushing polyurethane foams after an extended crush time at an elevated temperature causes permanent densification of the center portion of the foam, rendering the entire piece unusable. This undesirable effect is reported in Mobay Chemical Company Technical Information Bulletin No. 38–F14, dated Nov. 25, 1959. U.S. Pats. Nos. 3,060,137 and 3,012,283 also disclose certain crushing techniques for polyurethane foams.

Completely cured polyurethane foams have been densified by applying heat and pressure simultaneously as described in U.S. Pat. No. 3,025,200. Thick sections of completely cured polyurethane foam cannot be easily densified because the poor heat transfer characteristics of the polyurethane foam makes it difficult to rapidly heat the thick section to a uniform temperature. In addition, if a uniform temperature is obtained in the thick section, it is difficult to obtain a uniform density gradient throughout the section, since the exterior layers are densified, while the center layer may be relatively unaffected by compression. Thus, U.S. Pat. No. 3,400,196 shows that relatively thin sections (up to about 2 inches) of completely cured polyurethane foam must be compressed, and the heating and compression must be done over an extended period between moving belts which are under the influence of a heat source. The resulting product, which is relatively thin (between about ¼ and about 1 inch in thickness, for example) is not useful for mattresses, cushions and the like, where foams having a thickness of 2 inches or greater are necessary. Furthermore, completely cured polyurethane foams which have been compressed to increase their density are unstable. These foams have a "memory" and reexpand when subsequently subjected to elevated temperatures without compression, or when contacted with certain solvents, as indicated in U.S. Pat. No. 3,342,922.

It is a primary object of this invention to provide an improved flexible, densified polyurethane foam having desirable stress-strain properties, such as a relatively uniform response to load.

It is another object of this invention to provide an improved flexible, densified polyurethane foam having improved resilience, as measured by the ball rebound test.

A further object of this invention is to provide a novel flexible, densified polyurethane foam which, after being completely cured, resists expansion when subjected to elevated temperatures without compression, or when contracted with certain solvents.

These and other objects of the invention will be apparent from the following detailed discussion.

Briefly, the foregoing objects are accomplished when a polyurethane foam-forming reaction mixture is allowedl to rise in a reaction zone, thereby forming a partially cured cellular material, maintaining the partially cured cellular material for a critical period of time at a critical environmental temperature, and applying a compressive force to the partially cured cellular material to reduce its volume by a desired amount. After removal of the compressive force and completion of the cure, the resulting flexible, densified polyurethane foams, with or without trimming, are useful as cushions and rug padding.

More specifically, it has been found that densified polyurethane foams having a density between about 1.5 and about 15 pounds per cubic foot, preferably between about 1.5 and about 10 pounds per cubic foot, and more preferably between about 2 and about 5 pounds per cubic foot can be prepared by allowing a polyurethane foam-forming reaction mixture having a free rise density between about 0.8 and about 4.0 pounds per cubic foot to rise, thereby forming a partially cured cellular material; maintaining the partially cured cellular material for a critical period of time at a critical environmental temperature and applying a compressive force to the partially cured cellular material to reduce its volume by a specified amount. The compressive force is removed and the foam is cured completely. The term "free rise density" used in the claims and specification herein defines the density a polyurethane foam would have if the foam-forming reaction mixture were allowed to rise and cure without the application of a compressive force.

Since densification begins around the middle of the partially cured cellular material when partially cured foam is compressed in this manner, in some embodiments outer layers of less dense flexible polyurethane foam may be present. Such materials are useful for many applications; alternately, they can be trimmed to remove the less dense exterior layers. Where densified polyurethane foams having outer layers of less dense polyurethane foam are provided, the term "a flexible, densified polyurethane foam" in the claims and specification herein refers to the densified layer. However, it is to be understood that the process of this invention pertains to the manufacture of flexible, densified polyurethane foams both with and without the aforementioned less dense exterior layers.

The densified foams provided according to the process of this invention are uniform in appearance, rendering them suitable for immediate use in various applications. Where less dense layers are present, the total product has a regular geometry and the densified layer is uniform.

The flexible, densified polyurethane foams described herein are further characterized by having a Sac factor preferably between about 2.3 and about 10. Sac factor, as determined by ASTM-1564-64T, is the ratio of 65 percent Indentation Load Deflection to 25 percent Indentation Load Deflection. The Sac factors of the densified polyurethane foams of this invention are high, and thus these foams have little tendency to "bottom-out." The term "bottoming-out" is employed in the cushioning trade to describe a foam in which there is a sensation of sinking through and hitting the bottom when someone sits on it. Thus, it will be apparent that the densified, polyurethane foams of this invention are highly useful for such applications as cushioning and rug padding.

In the preparation of the densified urethane compositions of this invention either the so-called "one-shot method" or the "semi-prepolymer technique" ("quasi-prepolymer" technique) may be employed. Any combination of polyols, including polyether polyols and polyester polyols, organic polyisocyanate, foaming agent, catalyst and other reactants capable of forming a flexible urethane foam can be employed in carrying out the process of this invention, and the term "polyurethane foam-forming reaction mixture" in the specification and claims herein is meant to include any such combination, with the proviso that the polyurethane foam-forming reaction mixture has a free rise density between about 0.8 and about 4.0 pounds per cubic foot. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize the polyether polyols in the preparation of the polyurethane foam-forming reaction mixture. To further illustrate suitable formulations, the polyether polyols, useful for the preparation of the polyurethane material of this invention, include oxyalkylated polyhydric alcohols having a molecular weight in the range between about 700 and about 10,000 and preferably between about 1,000 and 6,000. The hydroxyl number of the polyether polyol is generally less than about 250 and preferably in the range between about 25 and about 175. These oxyalkylated polyhydric alcohols are generally prepared by reacting in the presence of an alkaline catalyst, a polyhydric alcohol and an alkylene oxide such as ethylene oxide, propylene oxide, butylene oxide, amylene oxide, epichlorohydrin, and mixtures of these alkylene oxides, by either random addition or stepwise addition.

Polyhydric alcohols suitable for use in preparing the polyether polyol include ethylene glycol, pentaerythritol, methyl glucoside, propylene glycol, 2,3-butylene glycol, 1,3-butylene glycol, 1,5-pentane diol, 1,6-hexane diol, glycerol, trimethylolpropane, sorbitol, sucrose, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. Suitable alkyl amines and alkylene polyamines include methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides, such as acetamide, succinamide and benzenesulfonamide, constitute a further class of such reactive hydrogen compounds. A still further class of such reactive hydrogen compounds is the di- and polycarboxylic acids, such as adipic acid, succinic acid, glutaric acid, aconitic acid, diglycollic acid, and the like. It will be recognized that the reactive hydrogen compound can be one containing different functional groups having reactive hydrogen atoms, such as citric acid, glycollic acid, ethanolamine, and the like. Aromatic polyamines such as toluene diamine can also be employed. Mixtures of oxyalkylated polyhydric alcohols are also suitable for use in the process of this invention.

The organic polyisocyanates used in the preparation of the densified urethane composition of this invention include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene - 1,5-diisocyanate, polyphenylene polymethylene isocyanate, mixtures thereof and the like. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index."

The partially cured polyurethane foams are prepared in the presence of a foaming agent, reaction catalysts, and preferably a small proportion of a conventional surfactant. The foaming agent employed may be any of those known to be useful for this purpose, such as water, as well as organic foaming agents containing up to about seven carbon atoms such as the halogenated hydrocarbons, lower molecular weight alkanes, akenes, ethers and mixtures thereof. Typical halogenated hydrocarbons include, but are not limited to: monofluorotrichloromethane, dichloromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to 50 parts by weight per 100 parts by weight of the polyol, and generally water is employed in an amount from about 1.0 to 6.0 parts by weight per 100 parts by weight of the polyol.

The partially cured polyurethane foams are prepared in the presence of a catalytic amount of a reaction catalyst. The catalyst employed may be any of the catalysts known to be useful for this purpose, or mixtures thereof, including tertiary amines and metallic salts, particularly stannous salts. Typical tertiary amines include, but are not limited to, the following: N-methyl morpholine, N-hydroxyethyl morpholine, triethylene diamine, triethylamine and trimethylamine. Typical metallic salts include, for example, the salts of antimony, tin and iron, e.g., dibutyltin dilaurate, stannous octoate, and the like. Any catalytic proportion of catalysts may be employed. Preferably, a mixture of amine and metallic salt is employed as the catalyst. The catalyst or catalyst mixture, as the case may be, is usually employed in an amount ranging between about 0.05 and about 1.5, and preferably between about 0.075 and about 0.50 percent by weight of the polyol.

It is preferred in the preparation of the polyurethane compounds of the present invention to employ minor amounts of a conventional surfactant in order to further improve the cell structure of the polyurethane foam. Typical of such surfactants are the silicone oils and soaps, and the siloxane-oxyalkylene block copolymers. U.S. Pat. 2,834,748 and T. H. Ferrigno, Rigid Plastic Foams (New York: Reinhold Publishing Corp., 1963), pp. 38–42, disclose various surfactants which are useful for this purpose. Generally up to 2 parts by weight of the surfactant are employed per 100 parts of the polyol.

Various additives can be employed which serve to provide different properties, e.g., fillers such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

More in detail, in the practice of this invention a polyurethane foam-forming reaction mixture comprising the above-described ingredients is fed to a suitable reaction zone such as by pouring into a suitable box or into a moving conveyor belt where reaction proceeds. The foaming reaction is exothermic, and auxiliary heat is not necessary to effect the reaction, although it can, of course, be employed. After the reactants have been admixed for a period of between about 0.1 and about 20 seconds, an emulsion or "cream" forms. As the temperature increases from the reaction, gas bubbles are generated, which cause the formation of an uncured cellular gel material which gradually increases in volume.

After generation of gas bubbles is completed, the rise of the uncured cellular gel material stops. The aforementioned critical process steps are employed at this point to provide densified foam compositions according to the teaching of this invention.

The first critical variable, which is referred to hereinafter as the "crush time," is the period of time which elapses between the completion of the rise of the uncured foam and the first application of pressure to the partially cured foam to effect crushing of the foam. In the process of this invention, this period of time can vary from 0 to about 10 minutes. While flexible, densified polyurethane foams can be obtained by compressing immediately after completion of the rise, practical operations allow at least about 5 seconds to elapse prior to crushing.

The second critical variable is the temperature of the ambience during the crush time. During this period it has been found that the partially cured cellular material must be maintained within a critical environmental temperature range that is related to the crush time. Thus, where the crush time is between about 0 and about 2.5 minutes, temperatures between about 45° and about 400° F. and preferably between about 45° and about 200° F. are employed. Narrower temperature ranges are utilized where the partially cured cellular material is maintained for a longer crush time. Thus, where the time interval is between about 2.5 and about 5 minutes, temperatures between about 45° and 100° F. and preferably between about 45° and about 85° F. are employed wherein about 5 to about 10 minutes elapse before the application of a compressive force to the partially cured cellular material. Conventional means, such as ovens and cooling systems, are employed, if necessary, to provide the desired temperatures.

In commercial operations, it is particularly preferred to operate under environmental conditions, and thus temperatures from about 70° to about 110° F. are employed therein while maintaining any crush time within the broad range of 0 to 10 minutes, and preferably between about 5 seconds and about 210 seconds.

At the end of the crush time, the partially cured polyurethane foam is compressed by any suitable means, such as rollers, platens, and the like.

The degree of deflection effected by the application of the compressive force is also critical to the practice of this invention. It is necessary to compress the partially cured cellular material to between about ⅔ and ⅒ of its original thickness after rise in order to provide good densified foams. The desired degree of compression is achieved by adjusting the opening between the compressive means.

The duration of the crush and the temperature of the crushing means and the ambience during crushing are not critical to the practice of the invention described herein. However, it is apparent that commercial operations will avoid long crush durations for economic reasons.

After the partially cured polyurethane foam has been subjected to the pressure of the compressive means, the compressive force is removed and curing of the compressed material is completed. Although the densified foam may be sufficiently cured to handle after removal of the compressive force, completion of the cure may take several days under ambient conditions. While curing can be accelerated by the application of heat, such treatment is not generally necessary since the foam will completely cure under ambient conditions. Thus, it will be recognized that completion of the cure can be effected with or without the use of elevated temperatures, and that both means are encompassed by the procedural step referred to in the description and in the claims herein as "removing the compressive force and completing the cure of the compressed cellular material."

After removal of the compressive force and completion of the cure, the densified foam may recover a small portion of the difference between its initial height and the crushing gap, the degree of recovery depending upon the particular process variables. Of course, since the foam has been densified it is apparent that it never completely regains its original dimensions.

As previously indicated, the densified polyurethane foams of this invention may have top and/or bottom layers of less dense flexible polyurethane foam. In such a product, the densified portion comprises uniformly dispersed crushed cells; the entire product has a regular geometry. This type of product is useful for certain applications such as cushioning, and it can also be trimmed to remove the less dense material therefrom.

Where it is desired to decrease or eliminate the exterior low-density polyurethane layers from the product, certain formulation variations can be employed. Thus, for instance, it has been found that the use of one of the previously described fluorine-containing foaming agents causes a marked decrease in the thickness of the exterior low-density polyurethane layers.

However, when it is desired to prepare mattresses or cushions having a densified core surrounded by a relatively thick layer or lightweight polyurethane foam, then conditions are controlled to permit the increase of the thickness of the exterior layer. Mattresses, for example, preferably have an internal densified core of about 4 inches, and an exterior light-weight layer about 1 inch thick on the top and bottom. If desired, however, mattresses may be formed completely from the densified core.

When thin sheets having an insignificant exterior layer are produced continuously, substantially no trim is necessary, and after curing the sheets may be cut into any desired length. Similarly when compositions having a relatively thick exterior layer are used for mattresses, very little trimming of the exterior layer is necessary when the process conditions are properly controlled, and only cutting to length is necessary after the composition has been completely cured. However, if desired, the less dense exterior layer may be separated by cutting, shearing or the like, from the densified core, which then may be cut into sheets or other desired shapes, depending upon the ultimate use of the densified foam.

If desired, the flexible, densified polyurethane foam of this invention can be prepared batch-wise. An illustrative batch process comprises feeding the foam-forming ingredients into a conventional box, allowing the foam to complete the rise, permitting the crush time to expire while maintaining an environmental temperature within the previously described critical range, removing the box from the partially cured cellular material, and then applying compressive means thereto. Pressure is applied to the foam by means of platens or rollers to compress it to between about $2/3$ and about $1/10$ of its original volume and then removed to permit the compressed foam to complete the cure.

However, it is preferred, particularly in commercial operations, to employ a continuous process for the preparation of the flexible, densified polyurethane foams of this invention. An exemplificative continuous process comprises admixing the foam-forming ingredients in a suitable mixing head and feeding the resulting mixture to a moving conveyor having suitable side retaining means to contain the liquid reactants. The side retaining means are necessary until the foam gels sufficiently to support its own weight. As the reaction proceeds while moving along the conveyor, bubbles form in the reaction mixture, which effects a volume increase and the formation of an uncured porous gel. After the uncured porous gel has traveled along the conveyor for a pre-determined crush time and at an appropriate environmental temperature selected in accordance with the teachings of this invention, the resulting partially cured cellular material is passed between at least 2 rotating crushing rollers, or other appropriate compressive means. Suitable means for slitting the densified polyurethane foam may be installed at a further point along the conveyor.

Various modifications of the aforesaid process may be employed without departing from the spirit of this invention. For example, the densified urethane composition of this invention may be formed into backing for floor covering such as rugs, tiles, carpets and the like by pouring the reaction mixture directly onto the back of a continuous moving length of floor covering, and compressing the resulting partially cured cellular material. The exterior layer of low density porous urethane compositions, if one forms under the operating conditions obtained, may be separated by cutting or shearing, but if desired, it may be retained as part of the backing of the floor covering.

As indicated above, the flexible, densified polyurethane foams of this invention have a wide variety of applications. Thus, for example, they are particularly valuable in the following areas: innersoles and liners for shoes; as backing, either as an integral part or a separate layer, for floor tiles made of rubber, asphalt, vinyl asbestos, vinyl, linoleum, chlorinated polyethylene elastomer, etc.; carpet backing and padding, either as an integral part or a separate layer, for carpets or rugs including wool, nylon, cotton, rayon, acrilan, polypropylene, and other types; mattresses; cushions; and furniture upholstery and construction.

Furthermore, they are useful for gasketing; padding applications of all types including floor pads for use in occupations requiring prolonged standing, table pads or table pad construction, key pads for musical (reed) instruments, and packaging uses for delicate instruments; belting uses, particularly where chemical reistance is important; special filter media; wheather-stripping; vibration insulators, including motor mounts; gymnastic equipment; hammers for piano construction; solid tires for fork-lifts, etc.; roofing systems, including use in laminates such as with chlorinated polyethylene; underlay for flooring materials; backing for floor sheeting materials as an integral part of the sheet; padding and case liners for delicate instruments; and industrial roll covering.

Other suitable applications for the flexible, densified polyurethane foams of this invention include elastomeric hammer heads; bottle cap liners; bulletin board construction; sealant gaskets, such as for drums, pails and other containers; wear-resistant stair treads and heavy-traffic-area floor covering; bumpers for loading docks and similar uses; blackboard erasers; squeegees for various applications; windshield wipers; door mats; skid-resistant, mar-resistant sheeting for underlining lamps, desk accessories, vases, appliances, etc.; presesure-sensitive tapes; phonograph turntable cushioning; automotive pedal covers; recoil pads for firearms; and automotive padding.

The following examples are presented to illustrate the invention more fully without any intention of being limited thereby. All parts and percentages are by weight unless otherwise specified.

EXAMPLES 1–3

A conventional, low-pressure, four-stream foam machine capable of pouring foam formulations was provided with a polyether polyol (a blend of 15 parts of oxypropylated glycol, molecular weight of 2000, per 85 parts of oxyalkylated glycerin obtained by oxypropylating glycerin to a molecular weight of 3700 followed by topping with five mols of ethylene oxide), toluene diisocyanate, water, catalysts, surfactant and chlorinated hydrocarbon. The feed rate was adjusted to provide a foam formulation with the following ingredients in the following proportions:

| Ingredients: | Parts by weight |
|---|---|
| Polyether polyol blend | 100 |
| Triethylene diamine | 0.15 |
| Silicone surfactant (General Electric SF 1034)* | 2.45 |
| Trichloromonofluoromethane | 10.0 |
| Stannous octoate | 0.2 |
| Water | 4.5 |
| Toluene diisocyanate (80% 2,4-, 20% 2,6-isomer; 105 Index) | 52.5 |

*This silicone surfactant is a block polymer of a dimethyl polysiloxane and a polyalkylene oxide. The polyalkylene oxide is a random linear copolymer consisting of 50 weight percent ethylene and 50 weight percent propylene oxides terminated with a butoxy group. The branched polysiloxane and each of the polyether blocks have a molecular weight of 1500 to 1800.

This foam formulation, which had a free rise density of about 1.0 pound per cubic foot, was utilized to prepare three foams, further identified as Examples 1, 2 and 3, respectively, in accordance with the following procedure. The reaction mixture was dispensed from the foaming machine into a square box having side dimensions of 16" and a height of 8". After bubbles appeared on the surface of the foam indicating the completion of the rise, the box was cut and the foam was removed and covered with brown paper on the top and bottom. This operation required approximately 30 seconds; the temperature of the environment was about 75° F. After allowing the foam to remain for an additional 90 seconds under these conditions, the foam sample was passed through rotating crusher rolls set at various openings as indicated in the table below.

| Example: | Foam height before crush, in. | Roll opening, in. | Foam height after crush, in. | Thickness of densified layer, in. | Density of densified layer (p.c.f.) |
|---|---|---|---|---|---|
| 1 | 9.5 | 3.0 | 3¾ | 2¾ | 2.8 |
| 2 | 9.0 | 2.0 | 2½ | 1½ | 4.7 |
| 3 | 9.0 | 1.0 | 1½ | ½ | 10.9 |

EXAMPLES 4-6

The procedure of Examples 1-3 was repeated employing the following ingredients in the following proportions:

| Ingredients: | Parts by weight |
|---|---|
| Oxypropylated glycerin (molecular weight 3000) | 100 |
| Trichloromonofluoromethane | 20 |
| Silicone surfactant of Examples 1-3 | 2.0 |
| Stannous octoate | 0.225 |
| Water | 4.0 |
| Triethylene diamine | 0.10 |
| Toluene diisocyanate (80% 2,4-, 20% 2,6-isomer; 101 Index) | 46.1 |

This foam formulation, which had a free rise density of about 1.0 pound per cubic foot, was utilized to prepare three foams, which are identified as Examples 4, 5, and 6, respectively. Each foam, after the rise had been completed, was maintained at room temperature (about 75° F.) for a crush time of 120, 75, and 45 seconds, respectively, prior to the application of the compressive force. The data for these examples is reported in the following table.

| Example: | Foam height before crush, in. | Roll height, in. | Foam height after crush, in. | Thickness of densified layer, in. | Density of densified layer (p.c.f.) |
|---|---|---|---|---|---|
| 4 | 8½ | 1 | 2 | ⅝ | 9.2 |
| 5 | 9 | 1 | 1¾ | ⅝ | 10 |
| 6 | 9 | 1 | 1 | 5/16 | 9.1 |

EXAMPLES 7-10

A polyurethane foam-forming reaction mixture was prepared from the following ingredients in the following proportions:

| Ingredients: | Parts by weight |
|---|---|
| Oxypropylated glycerin (molecular weight 3000) | 100 |
| Toluene diisocyanate (80% 2,4-, 20% 2,6-isomer; 105 Index) | 49.8 |
| Stannous octoate | 0.25 |
| Triethylene diamine | 0.10 |
| Water | 4.0 |
| Silicone surfactant (Dow Corning DC-190)* | 1.5 |

*This surfactant is a block copolymer of a polydimethylsiloxane and a polyether resin.

The foam formulation was utilized to prepare four foams, identified as Examples 7, 8, 9, and 10, respectively. In Example 7 the above-identified formulation was used to prepare the foam. In Examples 8, 9, and 10, five parts, ten parts and fifteen parts, respectively, of trichloromonofluoromethane were added to the above-identified formulation prior to forming the foam. The formulation of Examples 7-10 were then each poured into a square box having side dimensions of about 12 inches and a height of about 6 inches. After the rise was completed, a crush time of 90 seconds (environmental temperature 75° F.) was allowed to elapse, and then the foam was crushed between platens on a hand press set at an opening of about 1.5 inches. The resulting foams were than measured for the thickness of the densified layer and exterior layers, and analyzed for density and strength. The results are set forth in the table below.

| Example | 7 | 8 | 9 | 10 |
|---|---|---|---|---|
| Parts of trichloromonofluoromethane | 0 | 5 | 10 | 15 |
| Free rise density of formulation, p.c.f. | 1.5 | 1.35 | 1.2 | 1.1 |
| Undensified layers, thickness, inches: | | | | |
| Top | 3/16 | 5/16 | 5/16 | ¼ |
| Bottom | 3/16 | 0 | 0 | 0 |
| Total | ⅜ | 5/16 | 5/16 | ¼ |
| Densified layer thickness, inches | 1⅜ | 1 7/16 | 1⅜ | 1⅜ |
| Total sample height, inches | 1¾ | 1¾ | 1 11/16 | 1⅝ |
| Density of densified layer, p.c.f. | 5.41 | 5.54 | 5.67 | 5.79 |
| Sac factor | 5.66 | 5.79 | 5.93 | 5.84 |
| Tensile strength, p.s.i., ASTM D1564-59T, sections 53-58 | 58.4 | 53.2 | 56.1 | 64.1 |

EXAMPLES 11-12

Two foam formulations, each similar to Example 7, were each used to form a foam in a square box having side dimensions of about 18 inches and a height of about 12 inches. After allowing both foams to remain at 75° F. for 90 seconds after completion of rise, they were passed through crushing rollers. Each original foam had a height of about 12 inches prior to crushing. The resulting densified foams are identified below as Examples 11 and 12, respectively.

| Item | Example 11 | Example 12 |
|---|---|---|
| Roller opening, in | 3 | 3.65 |
| Crushed height, in | 3⅞ | 5 |
| Thickness of densified layer, in | 3 | 4 |
| Density, outer layers/densified layer, p.c.f | 1.5:4.9 | 1.5:3.2 |
| 25 percent indentation load deflection, lbs | 64 | 46 |
| Sac factor | 6.0 | 5.0 |

EXAMPLE 13

A polyurethane foam-forming reaction mixture similar to that of Example 7 was employed to prepare a densified polyurethane foam utilizing a crush time of 90 seconds. An environmental temperature of approximately 75° F. was maintained during the crush time and the partially cured cellular material was crushed from an original height of 5 inches to 3.3 inches. The resulting densified polyurethane foam had smooth, uniform surfaces and was comprised mainly of polyurethane foam having a density of 1.9 pounds per cubic foot; the final height of the foam after curing was 3.3 inches.

EXAMPLES 14–15

A polyurethane foam-forming reaction mixture was prepared from the following ingredients in the following proportions:

Ingredients: Parts by weight
  Oxypropylated glycerin (molecular weight 3000) _____ 100
  Toluene diisocyanate (80% 2,4-, 20% 2,6-isomer; 105 Index) _____ 34.3
  Stannous octoate _____ 0.20
  Triethylene diamine _____ 0.10
  Water _____ 4.0
  Silicone surfactant of Examples 7–10 __ 1.5

This foam formulation, which had a free rise density of 1.5 pounds per cubic foot, was utilized to prepare two densified polyurethane foams, identified as Examples 14 and 15 respectively. Each original foam had a height of about four inches and was compressed to a height of one inch. The foam represented by Example 14 was crushed 12 seconds after completion of rise while a crush time of 6 seconds was employed to prepare the foam of Example 15. The temperature of the ambience during the crush time was approximately 75° F. for both foams. Uniformly densified polyurethane foams of excellent quality were obtained. The foam represented by Example 14 had a density of 7.2 pounds per cubic foot, while the foam of Example 15 had a density of 6.9 pounds per cubic foot; both foams had a final height of one inch.

EXAMPLE 16

A polyurethane foam-forming reaction mixture was prepared from the following ingredients in the following proportions:

Ingredients: Parts by weight
  Oxypropylated glycerin (molecular weight 3000) _____ 100
  Toluene diisocyanate (80% 2,4-, 20% 2,6-isomer; 105 Index) _____ 39.4
  Stannous octoate _____ 0.20
  Triethylene diamine _____ 0.10
  Trichloromonofluoromethane _____ 20.0
  Water _____ 3
  Silicone surfactant of Examples 7–10 __ 1.5

Following the procedure of the previous examples, the resulting mixture, which had a free rise density of about 1.1 pounds per cubic foot, was poured and allowed to rise to a height of 5 inches. After completion of the rise, the foam was placed in an oven heated to 110° F. for 10 minutes. At the end of this period, the partially cured cellular material was crushed to a height of 0.5 inch. After removal of the compressive force, a uniformly densified polyurethane foam having flat, smooth surfaces, a total thickness of approximately 0.5 inch and a density of 9.6 pounds per cubic foot was obtained.

EXAMPLE 17

A polyurethane foam-forming reaction mixture similar to that of Example 16 was employed to prepare a densified polyurethane foam as described in the previous examples. An environmental temperature of 400° F. was maintained during the 2-minute crush time and the resulting partially cured cellular material was compressed from an original height of 5 inches to 1.25 inches. A uniformly densified polyurethane foam having a height of 1.25 inches and a density of 4.4 pounds per cubic foot was obtained.

EXAMPLE 18

A flexible polyester based polyurethane foam formulation was prepared by admixing the following ingredients in the following proportions:

Ingredients: Parts by weight
  Polyester of adipic acid, trimethylol propane and diethylene glycol (corrected hydroxyl number 45–52) _____ 100
  Toluene diisocyanate (80% 2,4-, 20% 2,6-isomer) _____ 53.5
  N-ethylmorpholine _____ 2.0
  Water _____ 4.3
  Ammonium oleate _____ 1.5
  Coupling agent (Witco Fomez 77–86 nonionic/anionic surfactant blend containing polyol, alcohol, carboxylic acid esters and oil soluble sulfonates) _____ 1.5

Following the procedure of the previous examples, a densified polyurethane foam was prepared employing a crush time of 90 seconds at an environmental temperature of 150° F. The foam was compressed from an original height of about four inches to one inch. A uniformly densified polyurethane foam having smooth surfaces, a height of one inch and a density of 7.7 pounds per cubic foot was obtained.

For purposes of comparison, the procedure was repeated with the exception that the mixture was allowed to cure in a conventional manner without crushing. A typical polyester flexible foam having a density of 1.64 pounds per cubic foot and a height of 4 inches was thereby obtained.

EXAMPLE 19

Following the procedure of the previous examples, a polyurethane foam-forming reaction mixture was prepared from the following ingredients in the following proportions:

Ingredients: Parts by weight
  Oxypropylated glycerin (molecular weight 3000) _____ 100
  Toluene diisocyanate (80% 2,4-, 20% 2,6-isomer; 105 Index) _____ 49.5
  Stannous octoate _____ 0.375
  Triethylene diamine _____ 0.1
  Silicone surfactant of Examples 7–10 __ 2.0
  Water _____ 4.0
  Trichloromonofluoromethane _____ 30.0

The mixture, which had a free rise density of 0.88 pound per cubic foot, was poured and allowed to rise to a height of 6 inches. The foam was crushed 110 seconds after completion of the rise to 2.4 inches; the temperature of the ambience during the crush time was approximately 75° F. After removal of the compressive force, a uniformly densified polyurethane foam having a height of about 2.4 inches and a density of 1.67 pounds per cubic foot was obtained.

COMPARATIVE EXAMPLES 1-10

For purposes of comparison, polyurethane foams were made following the teachings of Mobay Chemical Co. Technical Information Bulletin TIB No. 38-F14, dated Nov. 25, 1959; this data is set forth in Comparative Examples 1-10. Where densification occurred, the foams were irregularly shaped, with non-uniform internal bands of densified foam. A densified polyurethane foam was also produced according to this invention, employing the same formulation as Comparative Example 4. In contrast, this polyurethane foam, described in detail in Example 20, was a uniformly densified material having a regular geometry.

In Comparative Example 1, a polyurethane form-forming reaction mixture was prepared from the following ingredients in the following proportions:

| Ingredients: | Parts by weight |
|---|---|
| Oxypropylated glycerin (molecular weight 3000) | 100 |
| Toluene diisocyanate (80% 2,4-, 20% 2,6-isomer; 110 Index) | 35 |
| Stannous octoate | 0.5 |
| Ethyl morpholine | 0.5 |
| Triethylene diamine | 0.05 |
| Silicone surfactant (Union Carbide L-520; organo-silicone fluid) | 1.0 |
| Water | 2.9 |

In Comparative Examples 2-4, the ingredients and proportions of Comparative Example 1 were used, but the isocyanate content was varied; thus, 36.5 parts by weight of toluene dissocyanate were used in Example C-2, 38 parts by weight in Example C-3, and 41 parts by weight in Example C-14.

Example 20 was carried out employing the same formulation as Example C-4 and the process conditions of this invention.

Employing the formulation of Example C-3, the crush time was varied in Comparative Examples 5-8.

A formulation identical to the formulation of Example 20 and Comparative Example 4, with the exception that 3.4 parts by weight of water were used, was employed in Comparative Examples 9 and 10.

The process variables and properties of the resulting polyurethane foams are tabulated below:

| Example | Crush time, minutes | Temperature during crush time, °F. | Foam height before cursh, inches | Percent deflection | Foam height after crush, inches | Geometry of foam | Degree of densification |
|---|---|---|---|---|---|---|---|
| C-1 | 30 | 150 | 2.5 | 90 | 2.5 | Fairly regular | None. |
| C-2 | 30 | 150 | 2.5 | 90 | 1.3-2.4 | Dumbell-shaped; uneven surfaces | Barely perceptible at top of material. |
| C-3 | 30 | 150 | 2.5 | 90 | 1.3-2.3 | do | Densified in center. |
| C-4 | 30 | 150 | 2.5 | 90 | 1.2-2.1 | do | Densified with hard band at top. |
| 20 | 1.5 | 110 | 2.5 | 75 | 0.95 | Uniform; regularly shaped; even surfaces | Uniformly densified; 5.20 p.c.f. |
| C-5 | 12 | 150 | 2.5 | 90 | 1.1-1.7 | Dumbell-shaped; uneven surfaces | Highly densified. |
| C-6 | 20 | 150 | 2.5 | 90 | 1.4-2.3 | do | Do. |
| C-7 | 30 | 150 | 2.6 | 90 | 1.8-2.6 | do | Some densification at top. |
| C-8 | 60 | 150 | 2.8 | 90 | 2.8 | Fairly regular; uneven surfaces | No densification. |
| C-9 | 17 | 150 | 3.5 | 75 | 3.4 | do | None. |
| C-10 | 19 | 150 | 3.5 | 95 | 1.9-2.7 | Dumbell-shaped; uneven surfaces | Densification in center band. |

For further purposes of comparison, highly densified polyurethane foams were made according to the teachings of U.S. Pat. 3,125,617; these materials, described in the following comparative examples, were found to be unsuitable for use as rug padding.

COMPARATIVE EXAMPLE 11

100 parts of a polyester were prepared from 2.5 mols of adipic acid, 0.5 mol of phthalic acid, and 4 mols of hexane triol. The polyester was heated to 135° C., and 2.5 parts of pulverized 1,5-naphthalene diisocyanate were introduced. The components were thoroughly mixed until the diisocyanate had melted completely and the mixture gelled to a clear ambercolored solid. Upon gelling, the temperature rose from 135° C. to 175° C. The solid mixture was allowed to cool to 75° C. and one part water and 0.5 part of hexahydro dimethyl aniline were introduced. Because the mixture had solidified, no mixing was possible and no foaming occurred; a rigid, solid, resinous mass was obtained.

COMPARATIVE EXAMPLE 12

100 parts of a polyester prepared from 11 mols of ethylene glycol and 10 mols of adipic acid was heated to 140° C. Twenty-five parts of 1,5-naphthalene diisocyanate were added to the heated polyester with intense mixing while the diisocyanate melted. After mixing for about 10 seconds, 2 parts of activator consisting of one part sodium phenate and 9 parts dibutyl phthalate were introduced. After mixing once more for about 7 seconds, the foaming process began. A polyurethane foam having a free rise density of 25 pounds per cubic foot was obtained.

In order to obtain a foam having a densified volume of 25 pounds per cubic foot, it was necessary to heat the polyester to 175° C.; in this procedure, the plunger was applied as soon as foaming of the ingredients had finished.

COMPARATIVE EXAMPLE 13

Comparative Example 13 was carried out following the procedure of Comparative Example 12, except that the plunger was applied immediately after the activator and the diisocyanate components were mixed into the polyester component at the onset of foaming. The foaming process was carried out in a closed mold against a stationary plunger; a highly densified polyurethane foam was obtained.

COMPARATIVE EXAMPLE 14

100 parts of the polyester described in Example 1 was heated to 135° C. and 25 parts of p-phenylene diisocyanate was introduced. The components were thoroughly mixed until the diisocyanate had melted completely; the mixture immediately gelled to a clear amber-colored solid. Upon gelling, the temperature of the mixture rose from 135° C. to 180° C. The solid mixture was allowed to cool to 75° C. At 75° C., one part water and 0.5 part of the adipic ester of N-diethyl amino ethanol were introduced.

Because the mixture had solidified, no mixing was possible and no foaming occurred. A rigid, resinous mass similar to that of Comparative Example 11 was obtained.

In order to demonstrate the superior properties of the densified polyurethane foams of this invention, the foams of Comparative Examples 12 and 13, and a polyurethane foam having a density of 5.9 pounds per cubic foot produced according to the process of this invention, were tested for use as rug padding. The basic equipment and procedure followed in this test is described by H. Schiefer in "Wear Testing of Carpets," Research Paper RP 1505, Journal of Research of the NBS, volume 29, Nov. 1942; an NBS machine was employed.

The densified polyurethane foam was produced according to the procedure of Examples 1-3; the feed rate of the foam machine was adjusted to provide a foam formulation with the following ingredients in the following proportions:

| Ingredients: | Parts by weight |
|---|---|
| Oxypropylated glycerin (molecular weight 3000) | 100 |
| Toluene diisocyanate (80% 2,4-, 20% 2,6- isomer; 105 index) | 49.7 |
| Stannous octoate | 0.238 |
| Triethylene diamine | 0.075 |
| Silicone surfactant of Examples 1–3 | 1.5 |
| Water | 4.0 |
| Verona Black Paste AU (Carbon black pigment dispersed in a polymer plasticizer with free hydroxyl groups) | 2.0 |

This formulation, which had a free rise density of 1.5 pounds per cubic foot, was allowed to rise to a height of 25 inches. Employing a crush time of 113 seconds, the foam was passed through crusher rolls having an opening of 4.2 inches. A densified polyurethane foam having a height of 6.5 inches and a density of 5.9 pounds per cubic foot was obtained.

Briefly, the test machine consists of a motorized, horizontal turntable operated at 80 rev./min. and a vertical wheel, which rolls on the turntable, thereby producing a wear track on the material covering the turntable. The vertical wheel rolls at 56 r.p.m. and is loaded by a weight and lever to have a plate pressure of 420 pounds and a brake pressure of 16 pounds. The test was conducted in a controlled-atmosphere room having a temperature of about 75° F. and a relative humidity of about 50%.

A ¼-inch thick disc of the aforementioned densified polyurethane foam of this invention was cut to cover the turntable. Three circular discs, approximately 3½ inches in diameter, were cut from the large disc at equidistant points along the intended wear track. Two of the apertures were filled in with discs of the foams of Comparative Examples 12 and 13 and one was replaced with the disc of polyurethane foam originally cut from it. Then the large disc containing the samples to be tested was placed on the turntable and covered with nylon Axminster carpet having a 5 lines/inch backing. After 10,000 cycles of the turntable, visual examination revealed that the material of Comparative Examples 12 and 13 had deep ridges and extremely irregular surfaces. Contrary to these samples, the densified polyurethane foam of this invention showed little evidence of wear; the surface having a wear track was still smooth to the touch.

EXAMPLES 21–23

Three pairs of foam samples, each pair being identified as Foam 21 and 21A, Foam 22 and 22A, and Foam 23 and 23A, respectively, were prepared in accordance with the procedure of Example 7, using the foam formulation of Example 7. Each foam was prepared by pouring equal portions of the foam formulation into square cardboard boxes having a side dimension of about 12 inches and a height of about 4 inches. After the rise of the foam was completed, as indicated by the appearance of health bubbles, the cardboard boxes were quickly removed and each foam was placed on the lower plate of a hand press in an oven heated to the desired temperature for the desired crush time, which is the period between the completion of the rise and application of pressure. Foams 21 and 21A were held at a temperature of 400° F. for a crush time of 2.5 minutes, Foams 22 and 22A at a temperature of 110° F for a period of 10 minutes. At the end of the respective crush times, the upper plate was applied to each foam to reduce the 4″ thick foam to a thickness of 1″ and held for a period of 90 seconds. The pressure was released, the crushed foams were removed from the oven and stored at room temperature.

Foams 21, 22 and 23 were tested 30 minutes after crush was completed to determine the density of the foam and the percent compression set of the foam, as determined by "Compression Set Test—Method B—Constant Deflection," which is disclosed in "Tentative Methods of Testing Slab Flexible Urethane Foam," ASTM D–1564–64T. In this test the thickness of small specimens of foam are measured at room temperature, the specimens are compressed between plates to a predetermined percentage of the original thickness (50 percent and 90 percent). The compressed specimens are then placed in an oven for 22 hours at a temperature of 70° C. and a relative humidity of 5 percent. The specimens and press are then removed from the oven, the specimens are removed from the press and after reaching room temperature, thickness of the specimens is then measured. The difference between the original thickness and the final thickness divided by the original thickness is used to determine the percentage of compression set. The average results for each pair of foam samples are presented in Table I.

Foams 21A, 22A and 23A were stored under room conditions for one week and the density and percentage compression set was also determined for each sample. The average results for each pair of foam samples are presented below in Table I.

TABLE I.—COMPARISON OF PROPERTIES OF DENSIFIED URETHANE FOAM 30 MINUTES AFTER CRUSH AND ONE WEEK AFTER CRUSH

| Sample | 21 | 21A | 22 | 22A | 23 | 23A |
|---|---|---|---|---|---|---|
| Crush temperature (° F.) | 400 | 400 | 200 | 200 | 110 | 110 |
| Crush time (minutes) | 2.5 | 2.5 | 5 | 5 | 10 | 10 |
| Crush ratio (inches) | 4/1 | 4/1 | 4/1 | 4/1 | 4/1 | 4/1 |
| Period after crush | ¹30 | ²1 | ¹30 | ²1 | ¹30 | ²1 |
| Density, pounds per cubic foot | 5.0 | 5.0 | 5.7 | 5.6 | 5.5 | 5.4 |
| Compression set, percent: | | | | | | |
| 50% deflection | 65 | 14 | 65 | 17 | 59 | 17 |
| 90% deflection | 97 | 23 | 94 | 30 | 96 | 35 |

¹ Minutes. ² Week.

Compression set measurements are directly related to the state of cure and the larger values represent a greater lack of recovery of original thickness which occurs in partially cured foams.

Table I shows that densified Foams 21, 22 and 23 thirty minutes after pressure was removed where relatively uncured, since they returned to less than 50 percent of their original thickness when compression was removed from the densified samples. In marked contrast, when the corresponding Foams 21A, 22A and 23A were subjected to the same compression set test one week later, the foam samples regained at least 65 percent of their original thickness when compression was removed. These tests show that freshly densified foams are not fully cured or even substantially fully cured prior to, during, or thirty minutes after crushing at the maximum temperature and time periods defined above. The tests further show that in this invention completely cured or substantially cured flexible foams are not crushed as disclosed in U.S. Pats. 3,025,200 and 3,400,196.

EXAMPLE 24

Using the foam formulation of Example 7, a partially cured foam was formed, compressed at room temperature, and allowed to cure to form a densified polyurethane foam having a density of 4 pounds per cubic foot. A portion of this sample having an average thickness in the direction of rise of 0.400 inch was placed in an oven and heated to a temperature of 350° F. for one hour. The foam was then removed from the oven and thickness was measured immediately thereafter. The average thickness of the example was 0.400 inch, which showed that the densified foam of this invention does not reexpand when subjected to elevated temperatures.

For purposes of comparison a polyester-based polyurethane foam was prepared which was reticulated to remove cell walls, and after completion of the cure, was compressed at a temperature above 100° C. to form a foam having a density of about 7.8 pounds per cubic foot. A portion of this foam having an average thickness of 0.450 inch was heated in the same oven at the same time as the foam of Example 23 for one hour at 350° F. The thickness of the foam was measured immediately after removal from the furnace and was found to average 0.510 inch. This comparison shows that completely cured foams which have been compressed while heated to a temperature above 100° C., will reexpand as much as 14 percent of the original densified thickness when subjected to elevated temperatures, such as 350° F.

EXAMPLE 25

A flexible, densified polyurethane foam based upon a polyether polyol was prepared by a procedure similar to Example 24 except that the crush ratio was increased sufficiently to form a densified foam having a density of about 8.4 pounds per cubic foot. This foam was subjected to the resiliency (ball rebound) test as described in ASTM Designation D1564-64T, Sections 88-94. In this test a metal sphere is dropped from a height of 18 inches onto the foam sample and the height of the rebound by the metal sphere from the foam sample is then measured in terms of percent of the original height. The average reading for the ball rebound test of the foam sample of this example was 52 percent.

For purposes of comparison the polyester-based reticulated foam used as a comparison in Example 24 was subjected to the ball rebound test and was found to have a ball rebound reading of only 34 percent.

For purposes of further comparison, a polyether-based foam similar to the foam formulation of Example 24 was used to prepare a free rise foam which was not subjected to compression while curing. After storing for several days to permit the foam to become completely cured, it was cut into sections of approximately 12" x 12" x 0.5". The slices of foam were crushed between heated platens of a hydraulic press at a temperature of 335° F. for 2 minutes at a crush ratio of 4:1, using a spacer size of 0.125 inch. The resulting compressed foam had a density of 8.1 pounds per cubic foot. When this foam was subjected to the ball rebound test a measurement of 37 percent was obtained.

Since larger ball rebound measurements indicate greater resiliency, it can be seen from these tests that the densified foam of this invention has a much greater resiliency than densified foams obtained by crushing completely cured foams at elevated temperatures. The resiliency of the foam of this invention was 53 percent greater than the polyester-based reticulated foam, and 40 percent greater than the polyether-based foam that was crushed after being completed cured.

EXAMPLE 26

In order to demonstrate the resistance to swelling in certain solvents of the densified polyurethane foams of this invention, samples of densified foam were prepared as in Example 24. The thickness of each foam sample was measured and the sample was then immersed in one of the solvents listed below for a period of one hour at room temperature. Each sample was then removed from the solvent, the thickness measured, and the percent increase of the thickness was then calculated, as indicated below in the table.

For purposes of comparison, additional polyurethane foam samples were prepared of the type used for comparison in Example 25 from a polyether by crushing the completely cured foam at an elevated temperature. The thickness of these samples was measured, each sample was immersed in one of the solvents listed below at room temperature for one hour, the sample was removed from the solvent and the thickness of the sample was measured. The percentage increase in the thickness of the sample was then calculated.

Also presented below in the table is the percentage of increase in swelling of the foam obtained by crushing completely cured foam as compared to the swelling of the foam of this invention.

| Solvent | Percent swell of— I, Ex. 26 foam | Percent swell of— II, prior art foam | Percent increase of swell of II over I |
|---|---|---|---|
| Tetrahydrofuran | 32 | 60 | 88 |
| Methylene chloride | 40 | 90 | 125 |
| Toluene | 25 | 70 | 180 |
| Acetone | 20 | 42 | 110 |
| Ethyl acetate | 25 | 60 | 140 |
| Secondary butyl alcohol | 10 | 20 | 100 |
| Trichloromethylene | 30 | 42 | 40 |

These comparative tests show that the densified polyurethane foam which has been crushed prior to curing in accordance with this invention is far superior in dimensional stability in selected solvents when compared to foams which have been densified with heat after complete curing.

EXAMPLE 27

A foam formulation corresponding to Example 7 was mixed until homogeneous and fed through a distributor on to a moving conveyor belt which was approximately 58 inches wide. Restraining walls on the side of the conveyor prevented the foam formulation from leaking over the sides. As the conveyor belt progressed away from the distributor, the foam formulation began to rise and reached a maximum height of 26 inches. The resulting partially cured foam bun having dimensions of approximately 58" x 28" was passed through crushing rollers having an opening of about 8.3 inches. After passing through the crushing rollers the bun reexpanded to a height of about 11 inches. Bun sections were cut in lengths of about 13 feet and these sections were stored for about 4 days at ambient conditions to completely cure the densified polyurethane foam. After completion of the cure, the bun sections were trimmed and then sliced into sheets having a thickness of about 0.40 inch. The density of these sheets was relatively uniform at about 3.5 pounds per cubic foot, and the resulting sheets were useful as rug padding.

For purposes of comparison, the polyether foam formulation of Example 7 was used to prepare a number of samples which were allowed to freely rise without being subjected to compression when partially cured. After storage for several days to permit the foam to become completely cured, it was cut into sections approximately 12" x 12" having the thickness indicated below in the table. The slices of foam were crushed between heated platens of a hydraulic press at a temperature of 335° F. for 2 minutes, using a spacer size indicated in the table. The characteristics of the densified foam is also presented in the table.

| Original sample thickness, inches | Crush ratio | Spacer size, inches | Crushed foam description |
|---|---|---|---|
| 0.5 | 2:1 | 0.25 | Densification complete at edges. |
| 1.0 | 2:1 | 0.50 | Densification—slight. |
| 2.0 | 2:1 | 1.0 | Densification—none. |
| 0.5 | 4:1 | 0.125 | Densification—complete. |
| 2.0 | 4:1 | 0.5 | Densification—none. |

These data show that it is possible to prepare large buns of relatively uniform density by the technique of this invention, while crushing completely cured foams in accordance with the prior art does not provide any densification at all when the crush ratio is as low as 2:1 and the thickness of the foam being crushed is greater than about 1 inch. The ½-inch sample compressed at a crush ratio of 4:1 had a density of 8.1 pounds per cubic foot, but it was not possible to densify a 2-inch thick sample to the corresponding density because of the poor thermal conductivity of the completely cured foam. Thus, it can be seen that this technique of crushing completely cured foam can only be used to crush relatively thin samples, and the resulting product has a relatively high density.

What is claimed is:

1. A flexible, densified polyurethane foam composition having a density between about 1.5 and about 15 pounds per cubic foot prepared by the process which comprises
   (a) placing a polyurethane foam-forming reaction mixture comprised of
       (1) a polyol,
       (2) an organic polyisocyanate,
       (3) a foaming agent and
       (4) a catalyst capable of forming a polyurethane foam having a free rise density between about 0.8 and about 4.0 pounds per cubic foot in a reaction zone and allowing the mixture to rise freely, thereby forming a partially cured cellular material;
   (b) applying a compressive force to the partially cured cellular material after the elapsing of a period of time between 0 and about 10 minutes after completion of the rise, thereby
   (c) reducing the volume of the partially cured cellular material to between about ⅔ and about 1/10 of its original volume; and
   (d) removing the compressive force and completing the cure of the compressed cellular material with the proviso that
       where the period of time between completion of the rise and application of the compressive force is between 0 and about 2.5 minutes, the partially cured cellular material is maintained at an environmental temperature between about 45° and about 400° F. for said period;
       where said period of time is between about 2.5 and about 5 minutes, the partially cured cellular material is maintained at an environmental temperature between about 45° and about 200° F. for said period, and
       where said period of time is between about 5 and about 10 minutes, the partially cured cellular material is maintained at an environmental temperature between about 45° and 110° F. for said period.

2. The composition of claim 1 having a density between about 1.5 and about 10 pounds per cubic foot.

3. The composition of claim 1 wherein the compressive force is applied to the partially cured cellular material after the elapsing of a period of time between 0 and about 10 minutes after completion of the rise and where said partially cured cellular material is maintaining at an environmental temperature between about 70° and about 110° F. for said period.

4. The composition of claim 1 wherein the polyol employed in the preparation of said polyurethane foam-forming reaction mixture is a polyether polyol.

5. The composition of claim 4 wherein said polyether polyol is oxypropylated glycerin.

6. The composition of claim 1 wherein said polyurethane foam-forming reaction mixture comprises oxypropylated glycerin having a molecular weight in the range between about 1,000 and about 6,000, toluene diisocyanate, water and a mixture of an amine and a stannous salt.

7. The composition of claim 3 wherein the polyol employed in preparing said polyurethane foam-forming reaction mixture is a polyester polyol.

8. The composition of claim 3 wherein the polyol employed in preparing said polyurethane foam-forming reaction mixture is a polyether polyol.

9. The composition of claim 8 wherein said polyurethane foam-forming reaction mixture comprises oxypropylated glycerin having a molecular weight in the range between about 1,000 and about 6,000, toluene diisocyanate, water and a mixture of an amine and a stannous salt.

10. A floor covering having improved resiliency and durability which comprises, in combination, the flexible, densified polyurethane foam composition of claim 1 and a floor covering in contiguous relationship therewith.

11. The composition of claim 3 having a density of between about 2 and about 5 pounds per cubic foot.

References Cited
UNITED STATES PATENTS

| | | | |
|---|---|---|---|
| 3,006,033 | 10/1961 | Knox | 264—54 X |
| 3,012,283 | 12/1961 | Foster | 264—321 X |
| 3,125,617 | 3/1964 | Hoppe | 264—54 |
| 3,246,059 | 4/1966 | Moroni et al. | 264—54 X |
| 3,442,411 | 5/1969 | Mahoney | 264—54 X |
| 3,056,168 | 10/1962 | Terry | 264—54 X |
| 3,506,600 | 4/1970 | Zocco et al. | 18—5 PUX |

PHILIP E. ANDERSON, Primary Examiner

U.S. Cl. X.R.

260—2.5 BD; 264—54, 321